United States Patent
Kageyama

[19]

[11] Patent Number: 6,161,323
[45] Date of Patent: *Dec. 19, 2000

[54] METHOD FOR EVALUATING A FISHING LURE

[76] Inventor: Colin J. Kageyama, 2322 NE. Lindsey Dr., Hillsboro, Oreg. 97124

[*] Notice: This patent issued on a continued prosecution application filed under 37 CFR 1.53(d), and is subject to the twenty year patent term provisions of 35 U.S.C. 154(a)(2).

[21] Appl. No.: 08/625,642

[22] Filed: Mar. 29, 1996

[51] Int. Cl.⁷ ..................................................... A01K 97/10
[52] U.S. Cl. ..................................... 43/4.5; 43/4; 43/17.5
[58] Field of Search ................................. 43/4, 4.5, 17.5, 43/1; 362/109, 154, 186, 293; 356/419, 421

[56] References Cited

U.S. PATENT DOCUMENTS

| | | |
|---|---|---|
| 2,809,458 | 10/1957 | Wilbourn . |
| 3,383,675 | 5/1968 | Allardice ................................. 362/186 |
| 3,897,157 | 7/1975 | McLaughlin et al. . |
| 3,971,929 | 7/1976 | Erdell ................................. 240/10.6 R |
| 4,052,608 | 10/1977 | Papenmeier ............................ 362/154 |
| 4,693,028 | 9/1987 | Hill . |
| 4,829,492 | 5/1989 | Choi et al. . |
| 4,899,480 | 2/1990 | Park ................................................ 43/4 |
| 5,014,171 | 5/1991 | Price ....................................... 362/277 |
| 5,037,346 | 8/1991 | Cimcock ................................. 446/419 |
| 5,178,450 | 1/1993 | Zelensky ................................. 362/154 |
| 5,196,964 | 3/1993 | Heine ..................................... 362/109 |
| 5,414,951 | 5/1995 | Martin ..................................... 43/17.5 |
| 5,511,335 | 4/1996 | Langer .......................................... 43/4 |

OTHER PUBLICATIONS

Gander Mountain Spring/Summer catalog, p. 131, 1991.

*Primary Examiner*—Kurt Rowan
*Attorney, Agent, or Firm*—Chernoff, Vilhauer, McClung, & Stenzel, LLP

[57] ABSTRACT

An exemplary fishing lure evaluation system includes a light transmission element, such a red-free green filter of 50% transmissivity, arranged relative to a light source for illuminating the lure under evaluation primarily with light transmitted through the element so as to reproduce the natural underwater illumination for the lure including the effects of the water coloration and the light level preference of the type of fish targeted. Preferably, a viewing element is included through which the lure is observed, such as a clear lens or red-free green filter of 50% transmissivity, to duplicate the effects of the water between the fishing lure and the fish for a nominal presentation distance. Specific forms of the invention include an assortment of filters for use with a conventional flashlight or, alternatively, a lightweight plastic tube having, for example, red-free green sides, an open end and a clear condensing lens at the opposite end to reproduce the primary winter feeding conditions for steelhead or salmon for short or long presentation distances depending on whether the user views the lure through the lens or the sides, respectively. The system permits evaluation of all types of lures including homemade lures, fluorescent lures and multicolored lures. A standard proven effective for the local fish population, such a natural food specimen, can be used to select a color attractive to this population, or the system can be used to grade the lures according to how well they hold their apparent color when observed with the system.

14 Claims, 7 Drawing Sheets

STEELHEAD 42

| WATER CONDITION (COLOR) | COLOR OF LIGHT TRANSMISSION ELEMENT | COLOR OF VIEWING ELEMENT | | |
|---|---|---|---|---|
| | | SHORT STRIKE | INTERMEDIATE STRIKE | LONG STRIKE |
| PRIMARY WINTER | RED-FREE GREEN 50% T | CLEAR | RED-MUTED GREEN 20-25%/50%T | RED-FREE GREEN 50% T |
| OCCASIONAL WINTER/ SUMMER | BROWN | BLUE-FREE BLOCK RED-FREE GREEN 50% T | CLEAR | RED-FREE GREEN 50% T | RED-FREE GREEN AND FROSTED WHITE 50% T |
| PRIMARY SUMMER | CLEAR OR BLUE | RED-MUTED GREEN 20-25%/50%T | CLEAR | CLEAR | RED-MUTED GREEN 20-25%/50%T |

STEELHEAD

| WATER CONDITION (COLOR) | COLOR OF LIGHT TRANSMISSION ELEMENT | COLOR OF VIEWING ELEMENT | | |
|---|---|---|---|---|
| | | SHORT STRIKE | INTERMEDIATE STRIKE | LONG STRIKE |
| GREEN (PRIMARY WINTER) | RED-FREE GREEN 50% T | CLEAR | RED-MUTED GREEN 20-25%/50% T | RED-FREE GREEN 50% T |
| BROWN (OCCASIONAL WINTER/SUMMER) | BLUE-FREE BLOCK RED-FREE GREEN 50% T | CLEAR | RED-FREE GREEN 50% T | RED-FREE GREEN AND FROSTED WHITE 50% T |
| CLEAR OR BLUE (PRIMARY SUMMER) | RED-MUTED GREEN 20-25%/50% T | CLEAR | CLEAR | RED-MUTED GREEN 20-25%/50% T |

FIG.4

| WATER CONDITION (COLOR) | COLOR OF LIGHT TRANSMISSION ELEMENT | COLOR OF VIEWING ELEMENT SALMON 44 |||
|---|---|---|---|---|
| | | SHORT STRIKE | INTERMEDIATE STRIKE | LONG STRIKE |
| PRIMARY WINTER/ RIVER — GREEN | RED-FREE GREEN 35%/40% T | CLEAR | RED-FREE GREEN 35%/40% T | NA |
| OCCASIONAL WINTER/ RIVER — BROWN | BLUE-FREE BLOCK RED-FREE GREEN 35%/40% T | CLEAR | BLUE-FREE BLOCK RED-FREE GREEN 35%/40% T | NA |
| OCEAN — CLEAR | RED-MUTED GREEN 25%/85% T | NA | NA | RED-MUTED GREEN 25%/85% T |

TROUT 46

| WATER CONDITION (COLOR) | COLOR OF LIGHT TRANSMISSION ELEMENT | COLOR OF VIEWING ELEMENT | | |
|---|---|---|---|---|
| | | SHORT STRIKE | INTERMEDIATE STRIKE | LONG STRIKE |
| GREEN OR BROWN | NA | NA | NA | NA |
| CLEAR OR BLUE<br>MID-LEVEL FEEDING 2-5 FT. DEPTH | RED-MUTED GREEN (LIGHT OR DARK) 25%/70% T OR 25%/85% T | CLEAR | RED-MUTED GREEN (LIGHT) 25%/70% T | RED-MUTED GREEN (DARK) 25%/85% T |
| CLEAR OR BLUE<br>SHALLOW FEEDING <2 FT. DEPTH | CLEAR | CLEAR | RED-MUTED GREEN 25%/70% T | RED-MUTED GREEN 25%/70% T |

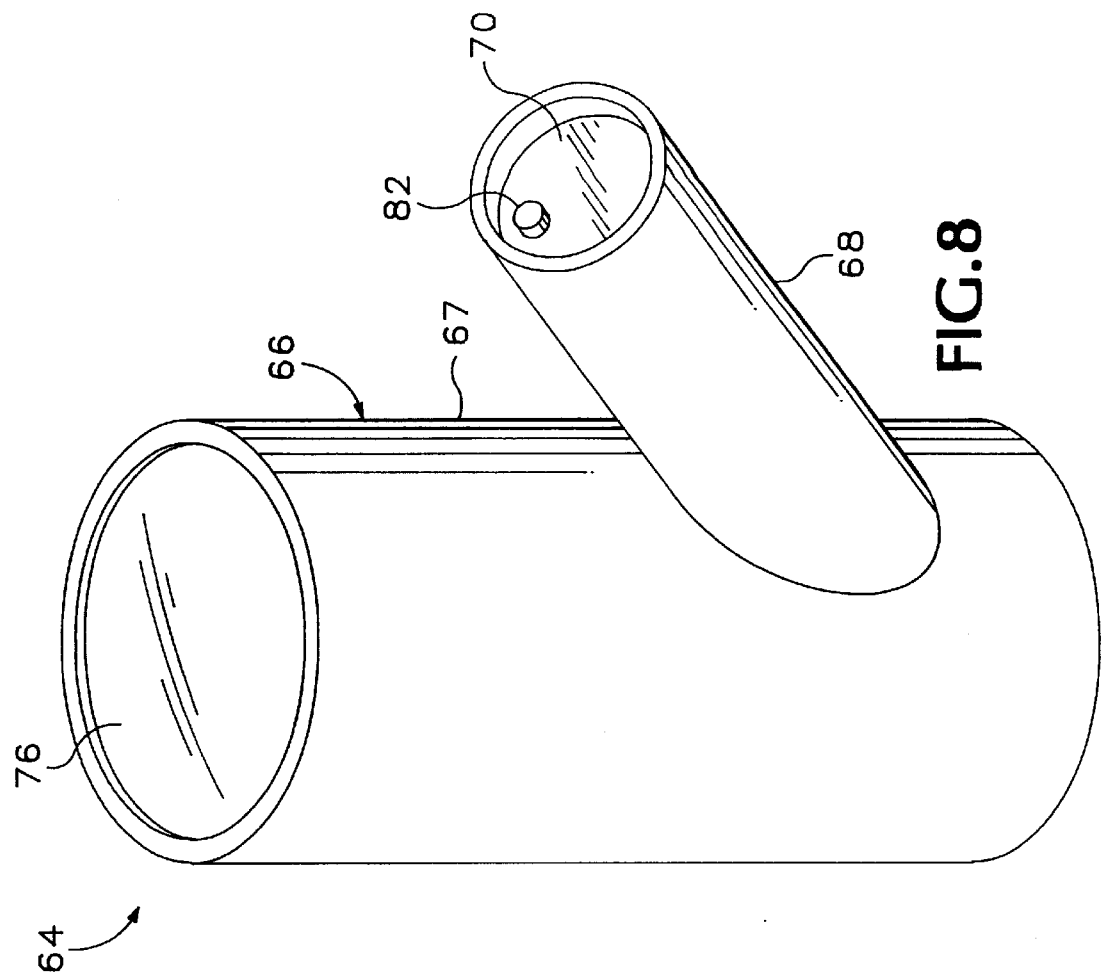
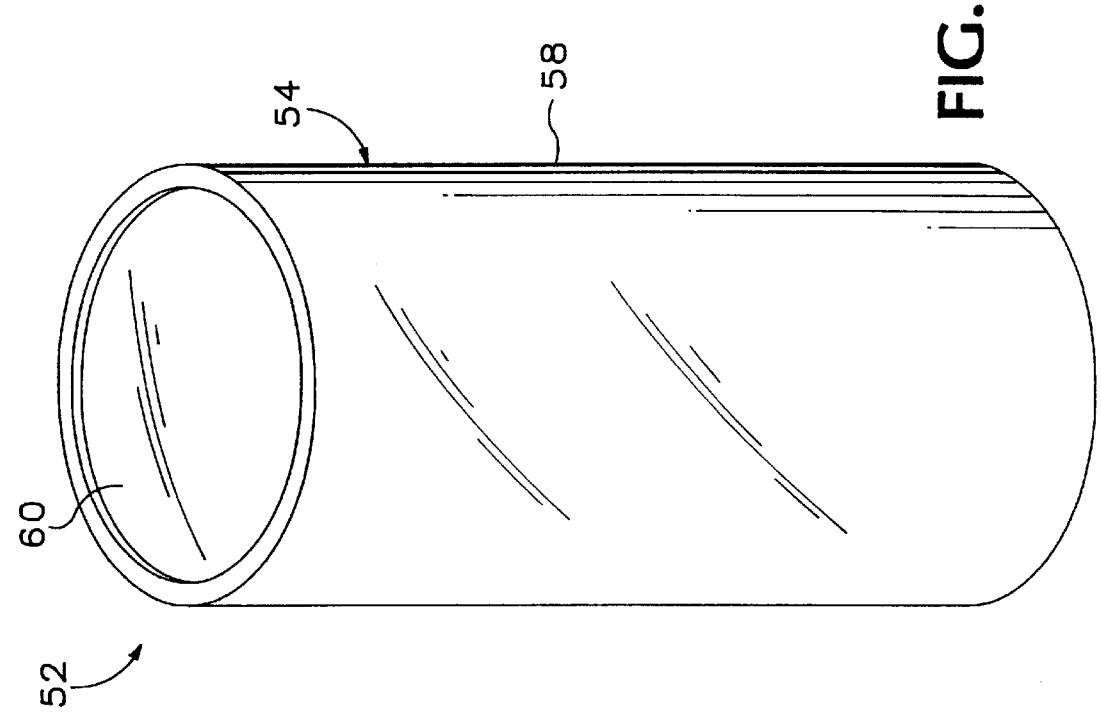
FIG. 7
FIG. 8

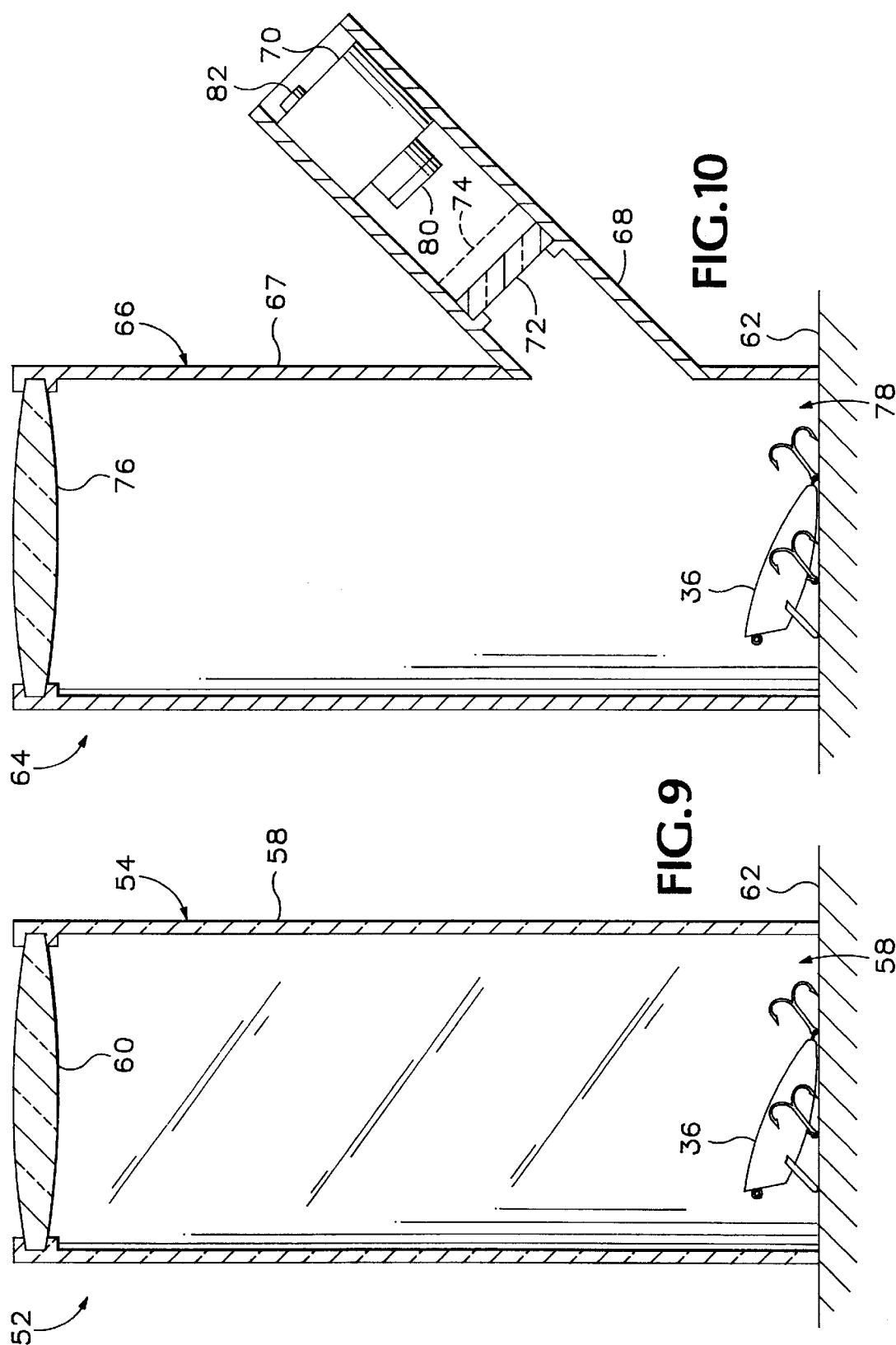

METHOD FOR EVALUATING A FISHING LURE

BACKGROUND OF THE INVENTION

The present invention relates to a method for evaluating the underwater effectiveness of a fishing lure and, in particular, relates to a system for reproducing the underwater color of the fishing lure as corrected for the light-filtering aspects of the water, the particular type of fish being targeted, and the nominal presentation distance from the lure to the fish in accordance with the underwater topography and the method of fishing being used.

It is known that the color of objects can shift when they are moved to a position underneath the water and that the degree of this shift can depend on the turbidity and depth of the water. In the field of under-water photography, in particular, it has been suggested that the water acts like a filter so that water of a blue-green color, for example, will absorb colors at the red end of the spectrum thereby causing progressively less red and orange light to reach an object as its underwater depth increases. This effect has apparently been reported in a publication of the Eastman Kodak Company entitled "The Fifth and Sixth Here's How," combined edition, pages 38–39 (1977). The Kodak article notes that there is one interesting exception to this effect, which is that fluorescent dyes retain their normal hue even at depths where a non-fluorescent dye of the same color would fade away.

This underwater color-shifting effect is known to fishermen of the more sophisticated type. Hence, author Paul Johnson, in his book entitled "The Scientific Angler," Charles Scribner's Sons, pages 89–91 and 162–163, NY (1984), reports on an experiment in which a color plate with seven fluorescent and seven non-fluorescent colors were photographed first above the surface of the water and then again at a specified depth beneath the water. Using color photographs to illustrate his findings, Johnson noted that whereas the non-fluorescent red and orange colors tended to turn black at relatively shallow depths, the fluorescent red and oranges, on the other hand, tended to hold their color at least to very large depths even though both the fluorescent and non-fluorescent colors looked substantially the same above the water. Substantially less color shift was observed with the blues and greens. The brightest color, from long-distances in blue water, was fluorescent yellow. Johnson further confirmed that as the level of water turbidity increased, that is, as the spectral character of the water went from being clear to being green, the difference in color shifts between the fluorescent and non-fluorescent colors occurred much more quickly.

This increase in color shift for increasing water turbidity is a factor of particular significance for anadromous fish. These fish, which include king salmon, silver salmon, steelhead trout and sea-run cutthroat trout, travel from the sea up small rivers and streams in order to spawn. This activity has commercially important consequences, and it has been estimated, for example, that over a hundred thousand fishermen in this country alone engage themselves in the pursuit of these cold-water "sea-run" fish. Since these fish tend to lie deep in turbid, rapidly moving water, lures that are used to catch these fish are particularly susceptible to the color shifting effect. In such water, light components of ultraviolet, orange, red, and infrared wavelength may fail to penetrate even to depths of 3–5 feet.

Based on the recognition that certain fishing lure colors are more effective than others, various systems have been developed to assist the fisherman in the selection of an optimal fishing lure color. One early type of system described in Wilbourn U.S. Pat. No. 2,809,458 provided a yellow weight suspended from a cord with a succession of color bands marked along the length of the cord. To use this device, the fisherman lowered the weight into the water until it disappeared from view and then identified the color of the band of cord then present at the surface of the water as representing the optimal color of the fishing lure. This device, in other words, assumed that there was a one-to-one correspondence between water opacity and the optimal fishing lure color but did not correct for other factors that were recognized as being important including the color-related filtering effect of the water and the intended depth at which the fishing lure was to be used.

In contrast to the relatively simple early device just described, later systems for indicating the optimal fishing lure color have relied on elaborate, expensive and easily-damaged equipment. In these later systems, typically a submersible probe unit is lowered into the water to the depth at which the lure will be used and a particular aspect of the light that reaches the probing unit at the specified depth is then electronically measured. This information is conveyed via cable to a readout instrument above the water surface.

In the system shown in McLaughlin et al. U.S. Pat. No. 3,897,157, for example, the probing unit includes a stacked assembly of color filters and photo-cells which are designed to measure the intensity of three different color components of the underwater light, namely red, blue and yellow. In accordance with the teachings of McLaughlin, the optimal color of the fishing lure corresponds to that one of the three color components that has the highest relative intensity at the specified depth.

A comparable but somewhat different system is shown in Hill U.S. Pat. No. 4,693,028, wherein a submersible photometer is used to measure the level of light transmittance (on a scale of 0 to 100%) at the specified depth. In addition, the turbidity level of the water (i.e., clear, stained or muddy) is separately determined and these two levels are then correlated, by means of a chart provided on the panel of the readout instrument, with an optimal color for the fishing lure (the optimal non-fluorescent color and the optimal fluorescent color are separately indicated and the instrument needle, if it falls on a line between two charted colors, is presumed to signify that either color is optimal).

In respect to the Hill system, in order to decide what color on the chart should correspond with a particular pair of measured light levels, Hill teaches that it is necessary to actually conduct carefully controlled tests with fish of the targeted type in order to draw a valid correlation, that is, in order to determine what colors are actually preferred by the targeted fish when presented with the specified light levels. Although the amount of testing required to make this correlation appears from his patent to be quite extensive, Hill supports his approach by pointing out that there appears to be little agreement as to how the color perception of fish either compares to that of humans or relates to environmental factors. Using the McLaughlin system as an example, Hill points out that McLaughlin presumes that fish see light as does a human whereas another researcher, F. A. Brown, concluded that at least with respect to bass, colors are seen by these fish in about the way that the same colors would appear to a person if viewed by that person through a yellowish filter. Hill further points out that McLaughlin assumes that the color component or wavelength that is the most intense at the specified depth is that which will be most attractive to the fish whereas another researcher, Professor Don McCoy, concluded that at least with respect to bass, some wavelengths were inherently more attractive to bass than other wavelengths regardless of relative brightness. Unfortunately, under the approach suggested by Hill, a large expenditure of effort is required to perform the studies needed to draw valid correlations from the collected data. Despite his own extensive investigations, Hill arrives at results that are only valid for one type of fish, namely bass. Hill does not indicate what data correlations are valid for other types of fish generally or for anadromous fish in particular.

A more fundamental difficulty that applies to each of the prior art approaches described hereinabove is the implicit assumption that the fisherman will always have on hand a lure that precisely matches the indicated "optimal" color. No allowance is made, in particular, for the fact that there are different gradations of red, for example, and that the red color on the lure may not actually match that closely the "optimal" red color identified by the prior art procedure. Nor do these prior art approaches impart useful information to the fisherman concerning the effectiveness of a lure that includes a combination of colors.

Another difficulty with each approach described hereinabove is that no adequate provision is made for the different action of non-fluorescent and fluorescent colors. Even Hill, who recognizes this difference, assumes that the fisherman will be able to accurately discriminate between lures of non-fluorescent and fluorescent color or between particular fluorescent shades that appear the same but that are formed of different color components. This assumption, however, is likely to be incorrect. It is a common practice among steelhead fishermen, for example, to use large amounts of "homemade" lures, composed of feathers, beads, yarn, colored tape, painted metal, and home-prepared baits, with little or no thought given as to quality control over the dye lots used. Furthermore, salmon and steelhead eggs are often prepared at home using combinations of salt, borax, sulfide, commercial homemade red dyes, brown sugar or even strawberry jello in order to preserve and color them. The average fisherman for these types of fish has no idea if the red coloring that is exhibited by his fishing lures is fluorescent or non-fluorescent. He has no idea of the color balance of any dye preparations he is using. A dye preparation may look red-orange but actually be composed of fluorescent yellow pigments mixed with non-fluorescent red pigments. Such a dye might look red-orange in the air but shift to an undesirable gray-yellow in the absence of red-orange light. It should also be recognized that one of the reasons homemade lures are popular for steelhead, salmon and other anadromous fish is because the rapidly moving water in which these types of fish are normally found results in a large number of snags and lost lures. This, in turn, is yet another reason why the fisherman is unlikely to have on hand a lure of precisely the "optimal" lure color.

In accordance with the foregoing, a principal object of at least a preferred embodiment of the present invention is to provide an improved system for evaluating a fishing lure for underwater effectiveness which is universally applicable to all types of fishing lures including homemade lures of unknown pigmentation.

A related object of at least preferred embodiments of the present invention is to provide an evaluation system that does not require the fisherman to determine whether his lure is fluorescent or non-fluorescent or what particular balance of dye components create the apparent color of the lure.

A further object of at least preferred embodiments of the present invention is to provide a system that evaluates accurately the underwater effectiveness of a fishing lure yet is simple to operate without the need for cumbersome, expensive and easily-damaged equipment.

SUMMARY OF THE INVENTION

In regard to the general factors leading to the development of the present invention, applicant would note that he is a Doctor of Optometry by profession as well as an avid fisherman. The development of this invention originally arose when he first recognized that certain procedures used in eye examinations, such as the use of filters to examine fluorescent pigments introduced into selected regions of the eye, might also have applicability to sport and commercial fishing which utilize fluorescent lures.

In accordance with a first aspect of the present invention, an apparatus for evaluating a fishing lure for underwater effectiveness is provided comprising a color filter and a mechanism for illuminating the fishing lure primarily with light transmitted through this filter.

Underlying this first aspect is the recognition that not only does water act like a filter but also the converse can be made to occur, that is, a filter can be made to act like water in the sense that it can be used to duplicate, in the context of a fishing lure, the light-filtering effect of the water on the light reaching the submerged lure. There is a further recognition, in this first aspect, that unfiltered light that might otherwise dominate and wash out this light-filtering effect can be reduced or removed so that the full effect can be properly observed. In accordance with this first aspect, the described apparatus can be used for reproducing the underwater color of any type of fishing lure thereby enabling whatever lures may be on hand to be evaluated for effectiveness with greater validity of result than is possible with a conventional above water inspection.

In accordance with a second aspect of the present invention, an apparatus is provided for evaluating a fishing lure for underwater effectiveness comprising a red-free green filter and a mechanism for illuminating the fishing lure with light transmitted through this red-free green filter.

Underlying this second aspect is the recognition that many widely different fishing activities can be grouped under a single classification (for example, steelhead or salmon fishing in the winter) that normally involve water conditions (green or brown water) that can be duplicated with a single type of filter (for example, a red-free green filter with or without a blue-free block).

In accordance with a third aspect of the present invention, a method is provided that includes the steps of providing a color filter and evaluating this fishing lure for underwater effectiveness by viewing the lure while illuminating it primarily with light transmitted through the color filter.

The recognition that underlies this third inventive aspect generally corresponds with that which underlies the first.

In accordance with a fourth aspect of the present invention, a method is provided which includes the steps of providing a color filter, obtaining a natural food specimen of a selected type of fish, and evaluating the fishing lure in relation to other fishing lures and in relation to the specimen, which evaluation is performed by illuminating each fishing lure and also the specimen with light transmitted through the color filter and in this way observing each in order to determine which one of said fishing lures most closely matches a color aspect of the specimen.

Underlying this fourth inventive aspect is a recognition that not only the condition of the water but also the local feeding habits of the fish can be a factor in determining the "optimal" color of the fishing lure and that the reproduced underwater color of a natural food specimen of a type being fed on locally by the fish provides an appropriate standard of comparison against which to evaluate the reproduced underwater color of a fishing lure.

In accordance with a fifth aspect of the present invention, a method is provided which includes the steps of selecting a first light transmission element of predetermined color based on a color-related aspect of a selected body of water and evaluating the fishing lure for underwater effectiveness in the selected body of water by viewing the fishing lure as illuminated with light transmitted through the light transmission element.

Underlying this fifth aspect is a recognition that not only can water act like a filter but that a filter can be used to duplicate certain color-related effects of water. Preferably, the first light transmission element is also selected based on a particular type of fish having a nominal light level preference. Certain types of fish are self-regulating insofar as they prefer a certain level of light and will actually move toward this level. This enables the first light transmission element to be chosen so as to duplicate this preferred level while avoiding the need to collect particularized information concerning light levels at different depths.

In accordance with a sixth aspect of the present invention, a method is provided which includes the steps of selecting a first viewing element based on a nominal presentation distance in a selected body of water between the fishing lure and a selected fish and evaluating the fishing lure for underwater effectiveness in the body of water including by viewing the fishing lure through the first viewing element.

Underlying this sixth inventive aspect is the recognition that the underwater color of the lure as presented to the fish not only depends on the filtering effect of the water in respect to the light that illuminates the lure but also depends on the filtering effect of the water in respect to the light transmitted from the lure to the fish. For nomenclature sake, the first factor might be termed the "deep water color shift" and the second factor might be termed the "long-distance color shift." It may be noted that this long-distance color shift may, in fact, occur over a short distance where, for example, the fish must enter a pocket in order to see the lure such as might occur when a "bottom-bouncing" fishing method is used. Further underlying this sixth aspect is a recognition that fluorescent colors, in particular, can be substantially affected by this long-distance color shift because the fluorescent color of a fishing lure is determined by its emitted light (and hence is subject to the long-distance color shift) even if this emitted light is triggered by light of a different wavelength (so that the fluorescent color of the lure is not, in fact, affected by the deep water color shift).

The foregoing and other objectives, features, and advantages of the invention will be more readily understood upon consideration of the following detailed description of the invention, taken in conjunction with the accompanying drawings.

BRIEF DESCRIPTION OF THE DRAWINGS

In FIG. 2, the lure is being moved by means of a trolling method, whereas in FIG. 3, a bottom-bouncing technique is being used for moving the lure.

FIGS. 4–6 each present a separate table in which, for a designated type of fish, the color of the light transmission element and the viewing element that is preferably selected for the lure-evaluation apparatus is indicated as correlated to the coloration of the water and the nominal presentation or "strike" distance.

FIG. 7 is a perspective view of a first alternative lure-evaluation apparatus constructed in accordance with the present invention.

FIG. 8 is a perspective view of a second alternative lure-evaluation apparatus constructed in accordance with the present invention.

FIG. 9 is a longitudinal sectional view of the first alternative lure-evaluation apparatus depicted in FIG. 9.

FIG. 10 is a longitudinal sectional view of the second alternative lure-evaluation apparatus depicted in FIG. 8.

DETAILED DESCRIPTION OF THE PREFERRED EMBODIMENTS

Figure 1:
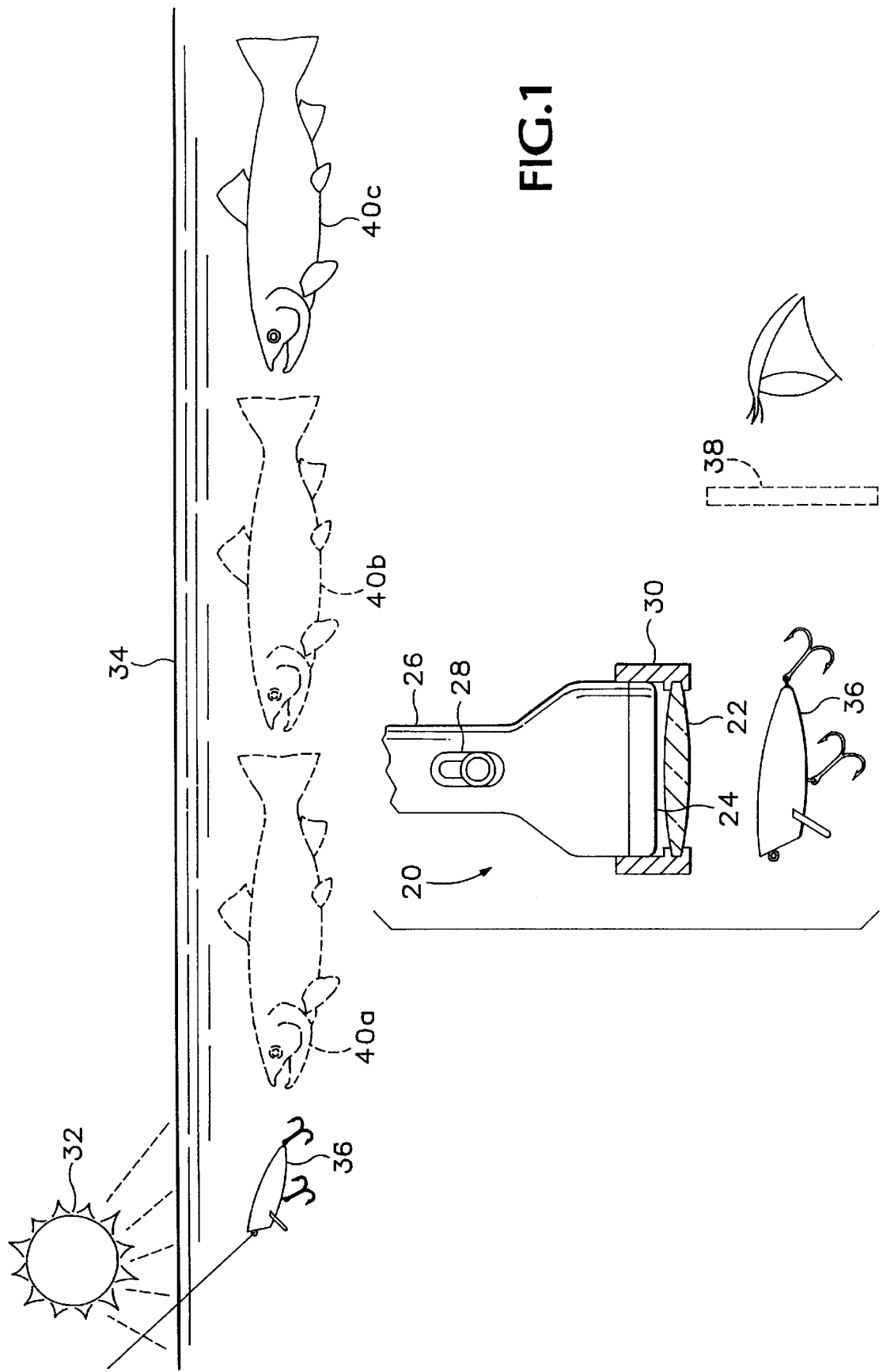
FIG. 1 is a sectional view of an exemplary lure-evaluation apparatus for evaluating a fishing lure, as shown in elevational view, for underwater effectiveness, which apparatus preferably includes a viewing element, as indicated in dashed-line view, and is desirably adapted for use in combination with a conventional flashlight, as shown in elevational view. Also depicted in FIG. 1 is a schematic representation of the fishing situation reproducible by the exemplary apparatus wherein dashed-line views of a fish are provided to indicate different nominal presentation distances.

Indicated with a bracket in FIG. 1 is an exemplary fishing lure evaluation apparatus 20 constructed in accordance with the present invention. In its most basic form, the apparatus comprises a first light transmission element or color filter 22 which is positioned in covering relationship over the light-emitting end 24 of a light source 26. This light source can comprise, as shown, a conventional flashlight with the usual sliding on/off switch 28, and the filter can either be held manually in covering relationship over the light-emitting end or, as shown, can be mounted mechanically over the end by means of an adaptor 30. In the preferred embodiment depicted, the color filter snaps into or out of the adaptor for convenient interchange-ability of color filter types. The adaptor, in turn, is press-fitted in a detachable manner over the end of the flashlight.

In accordance with the techniques that are described hereinbelow, the apparatus 20 can be used to evaluate one or more fishing lures 36. It will be noted that the term "lure" as used throughout this specification and in the claims is used in its broadest sense to refer not only to a fully assembled fishing lure but also, for example, to a particular component later used to complete the assembly of the lure, such as a thread or feather, or, more generally, to any item that the fisherman might use to attract the fish.

In respect to the lure-evaluation apparatus 20, the type of color filter selected for use as the light transmission element 22 is preferably based on the anticipated or actual local fishing conditions. In particular, one of the factors used in selecting the filter type is preferably the color of the water at the site where the lure will be used since the filtering effect that the water has on the light that is transmitted through the water to illuminate the fishing lure relates to this color. In essence, as FIG. 1 suggests, the light source 26 and the transmission element or filter 22 act together to duplicate the effect of the sun 32 and the water 34, respectively, so that the light that passes through the filter 33 to illuminate the fishing lure 36 is a reproduction of that which illuminates the lure when the lure is underwater.

To consider a specific example, if the color of the water is green, the red component of the light transmitted through the water will be fully absorbed at a relatively shallow depth, an effect that is known in the prior art in accordance with underwater tests. If steel-head are the targeted fish, these fish prefer to feed at an intermediate depth of about 3–10 feet. Therefore, there is unlikely to be any red component in the light that passes through the water and illuminates the lure when the lure is at the feeding depth of this type of fish. Accordingly, as indicated in table 42 of FIG. 4, which shows, for steelhead, which filter combinations are preferred for different water conditions, a red-free green filter is preferably selected for use as the light transmission element 22 in this particular situation since this type of filter, like the green water, will prevent any red component of the light from reaching and illuminating the fishing lure. In this manner, apparatus 20 reproduces in the light that illuminates the fishing lure under evaluation, the light that would illuminate the lure at the preferred feeding depth of the targeted fish.

As further indicated in FIG. 4, as the color of the water changes, the preferred color of the light transmission element 22 also changes. Thus, in clear or blue water, the red component of the light passing through the water is not absorbed as quickly as it is in green water so that at least a residual portion of the red component of light is likely to penetrate to the mid-level feeding depth at which steelhead feed. Accordingly, as indicated in table 42 of FIG. 4, a red-muted green (also known as a non-red-free green) color filter is preferably selected for the light transmission element 22 to reproduce this type of condition. Such a filter would nominally exhibit 20–25% transmissivity in respect to the red component of light.

In respect to a brown water condition, which represents a maximum level of suspended particulate matter and turbidity in the water, the filtering effect of this type of water is such that not only the red component of the light passing through the water but also its blue component is rapidly absorbed (as a general rule, the most rapidly absorbed light component in turbid water is the red component, followed by orange, blue, and finally, at much greater depths, green and yellow). Accordingly, as indicated in table 42 of FIG. 4, a red-free green color filter together with a blue blocker, which together block the transmission of both the red and blue light components, are preferably selected for the light transmission element 22 in situations involving brownish water. The blue-free block can either be an integral aspect of the red-free green filter or a stacked pair of filters can be used where one filter serves as the red-free green filter and the second serves as a blue blocker.

In addition to the expected or anticipated water coloration, another desirable factor in selecting the light transmission element 22 is the nominal light level preference of the particular type of fish of interest. Underlying this factor is the recognition that generally anadromous fish, such as cutthroat trout, steelhead, or salmon, are self-regulating with respect to the transmissivity level of the water at the depth at which they prefer to feed. In other words, if the transmissivity level of the water at the feeding depth is too high for a particular type of fish, so that the level of the dominant light component is too large for that fish, the fish will move downward in the water until a comfortable transmissivity or light level is reached. Conversely, if the transmissivity of the water and corresponding light level is too low, the fish will move upward to reach its nominal light level preference. Notwithstanding, then, the technique needed for a fish such as bass which feeds over a wide range of light levels, it is not necessary with trout, steelhead, salmon or other such fish to submerge an electronic probe into the water in order to measure transmissivity or other light-related data at the feeding depth. Instead, these differences in nominal light level preferences for at least the indicated types of anadromous fish can be corrected for by adjusting the transmissivity of the light transmission element 22.

The procedure just described is utilized in connection with the preferred filter types that are presented in tables 42, 44 and 46 (FIGS. 4, 5 and 6) for use in connection with steelhead, salmon and trout, respectively. In the case of a mid-level feeder such as steelhead, which feeds at about 3–10 feet in depth and prefers intermediate levels of light, the filters 22 that are selected preferably have an intermediate level of transmissivity of about 50% (in the case of the red-muted green filter that is shown in the tables, the lower transmissivity value indicated to the left of the slash (/) symbol represents the transmissivity value for the red light component). In the case of a relatively shallow feeder, such as cutthroat trout, which normally feeds at less than 3 feet in depth (or occasionally down to 5 feet) and which prefers relatively high levels of light, the filters 22 that are selected preferably have relatively higher transmissivity values in about the range, for example, of 70–85%. In the case of a deep feeder, such as salmon, which normally feeds below 10 feet and which prefers relatively low levels of light, the selected transmission elements or filters 22 preferably have a relatively low transmissivity value of, for example, about 35–40%. In respect to salmon, an exception to this general rule occurs with ocean fishing since the sediment on the bottom of the ocean surface normally does not become stirred up sufficiently to affect the normally clear coloration of the ocean water. This situation can be reproduced by using a color filter of relatively high transmissivity such as about 85%.

It will be recognized that the foregoing approach, wherein the transmissivity of the light transmission element 22 is adjusted to correct for the different light level preferences of different types of fish, has several advantages over the conventional approach wherein the light levels are measured with an electronic probing unit at the particular depth at which the lure will be used. Under the approach of the present invention, it is not necessary, for example, to lug around heavy and expensive equipment nor is it necessary to spend long periods of time setting up and calibrating equipment. Perhaps even more importantly, the type of rapidly moving water that is found in the streams and rivers where anadromous fish feed is prone to cause snags and can be the cause of substantial damage to delicate equipment such as electronic probes. However, no such undesirable effects can occur with respect to the system of the present invention since this system operates completely outside the water.

In respect to the system of the present invention, it is desirable not only to select the proper light transmission element 22 based on the factors discussed above, it is also desirable to ensure that any ambient light which is not a part of the light transmitted through the light transmission element be substantially reduced so that the underwater illumination reproduced by the light passing through the transmission element is not cancelled or washed out by this ambient light. In other words, the light illuminating the fishing lure 36 under evaluation should primarily consist of that light which is transmitted through the light transmission element without undue contribution from other sources of ambient light.

With respect to the basic form of the exemplary evaluation apparatus 20 shown in FIG. 1, this criteria can be readily met by conducting the evaluation of the lure in a room that has been darkened except for any light which is being supplied by the light source 26. This ensures that any light illuminating the lure has first passed through the light transmission element 22 so that there is no distortion from other light and a closer reproduction of the underwater color of the fishing lure is thereby achieved.

A particular advantage of the evaluation procedure just described is that a number of lures can be examined simultaneously. With this procedure, in other words, it is possible to lay a number of lures on the surface of a viewing table and to make side-by-side comparisons of one lure with another or, in the alternative, of each lure with an independent standard that has been selected by the fisherman on the basis of its proven local attractiveness to the desired type of fish. This standard might consist, for example, of a natural food specimen of the desired fish, such as fish eggs or aquatic insect life. Alternatively, the standard may be another lure that has been previously proven to be effective by either the fisherman himself, a fishing partner or a trustworthy associate. As these alternatives suggest, the fisherman is not limited under the present invention to the choice of one or two "optimal" colors as a result of the evaluation process but rather is afforded the opportunity to reach his own conclusions as to the "optimal" color based, for example, on the feeding preferences of the local fish population. Even when, for example, the standard is not just one color but instead appears to include a combination of different colors, the described procedures remain valid.

If an independent standard is not available as a basis for comparison, the fisherman can utilize other criteria in order to evaluate his lures. For example, absent other information, one can presume that the relative underwater visibility of each lure, as observed in accordance with the system of the present invention, directly correlates with underwater effectiveness. Yet another criteria is to rank the lures according to how well they are able to hold their apparent color when examined in accordance with the present invention for use in a wide variety of different fishing conditions. Underlying this criteria is the recognition that the exemplary fishing-lure evaluation apparatus 20 can be used, in effect, as a mechanism for achieving quality control.

A particular example may now be considered to illustrate the application of the inventive aspects described in a general fashion above. In the winter, in rivers and streams where sea-run fish can be found, the water will typically be green or sometimes brown because such water is sufficiently disturbed typically to bring up sediments that give the water this green or brown coloration. Assuming that it is winter and that the target fish is salmon, which is a deep level feeder, it can therefore be predicted that the filtering effect of the water will be such as to completely absorb the red component of any light that reaches the underwater lure. If the water is brown rather than green, it can also be predicted that the blue component of such light will be completely absorbed. Finally, since salmon prefer relatively low light levels, it can be predicted that the transmissivity of the water at the feeding depth will be correspondingly low. Accordingly, as indicated in the table of FIG. 5, the color filter selected for the light transmission element 22 under conditions of this type is preferably a red-free green filter with 35–40% transmissivity for light components other than red together with the option of a blue-free block.

It will be assumed further that the fisherman has some fish eggs that newspaper reports have confirmed have been effective for the local salmon population. Using the exemplary evaluation apparatus 20 to examine these eggs, the fisherman might discover that although these eggs appear red above the water, the color of these eggs shifts to yellow when they are examined with light transmitted through the indicated red-free green filter. In accordance with this discovery, the fisherman might decide to select as the preferred lure that lure in his collection which, when examined by means of the exemplary apparatus 20, most closely matches the observed yellow color of the fish eggs. On the other hand, some red fish eggs are essentially of a non-fluorescent red color. These fish eggs, if they were to be examined by means of the filter elements hereinabove indicated, would appear to be black. Correspondingly, then, a black lure would be selected as the preferred lure in accordance with the lure color observed using the exemplary apparatus. As an alternative approach, a fisherman could use the exemplary apparatus to select those lures which best hold their color from the standpoint of showing minimal color shift between their above water appearance and their reproduced underwater appearance.

In reference to FIG. 1, in addition to a light transmission element 22, preferably the fishing-lure evaluation apparatus 20 provides a viewing element 38. As schematically represented in FIG. 1, the purpose of this viewing element is to reproduce the effects of various presentations distances between the underwater fishing lure and the fish, that is, the nominal presentation distance may be short, as indicated with fish 40a, it may be intermediate, as indicated with fish 40b, or it may be long, as indicated with fish 40c. The present invention, in other words, recognizes that it is desirable not only to correct for the filtering effect of the water that lies between the natural light source 32 and the underwater lure 36 but also for the filtering effect of the water that lies between the lure and the fish.

Figure 2:
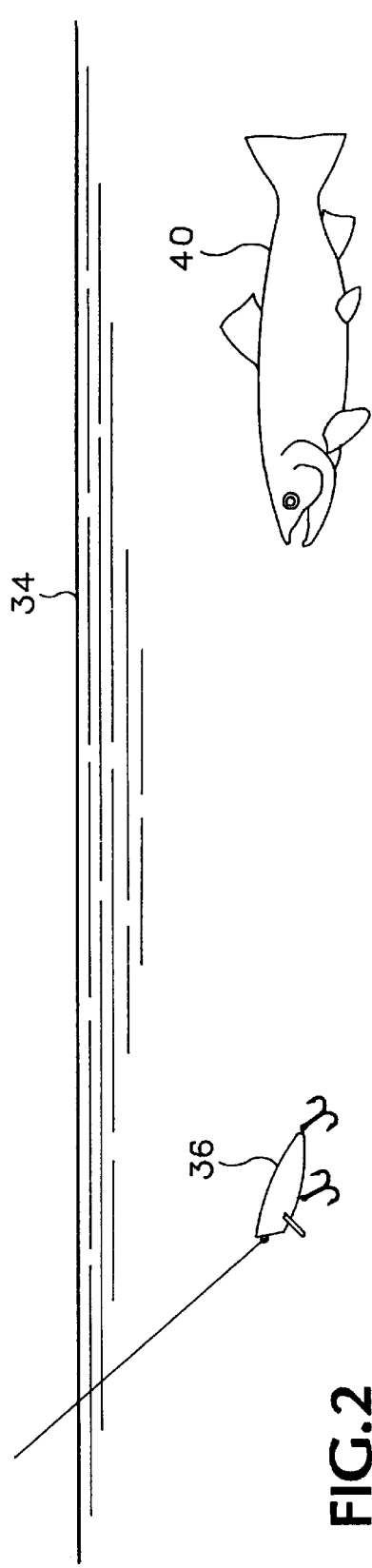
FIGS. 2–3 are schematic representations that indicate how the nominal presentation distance can vary depending on the manner in which the lure is being moved through the water.
Figure 3:
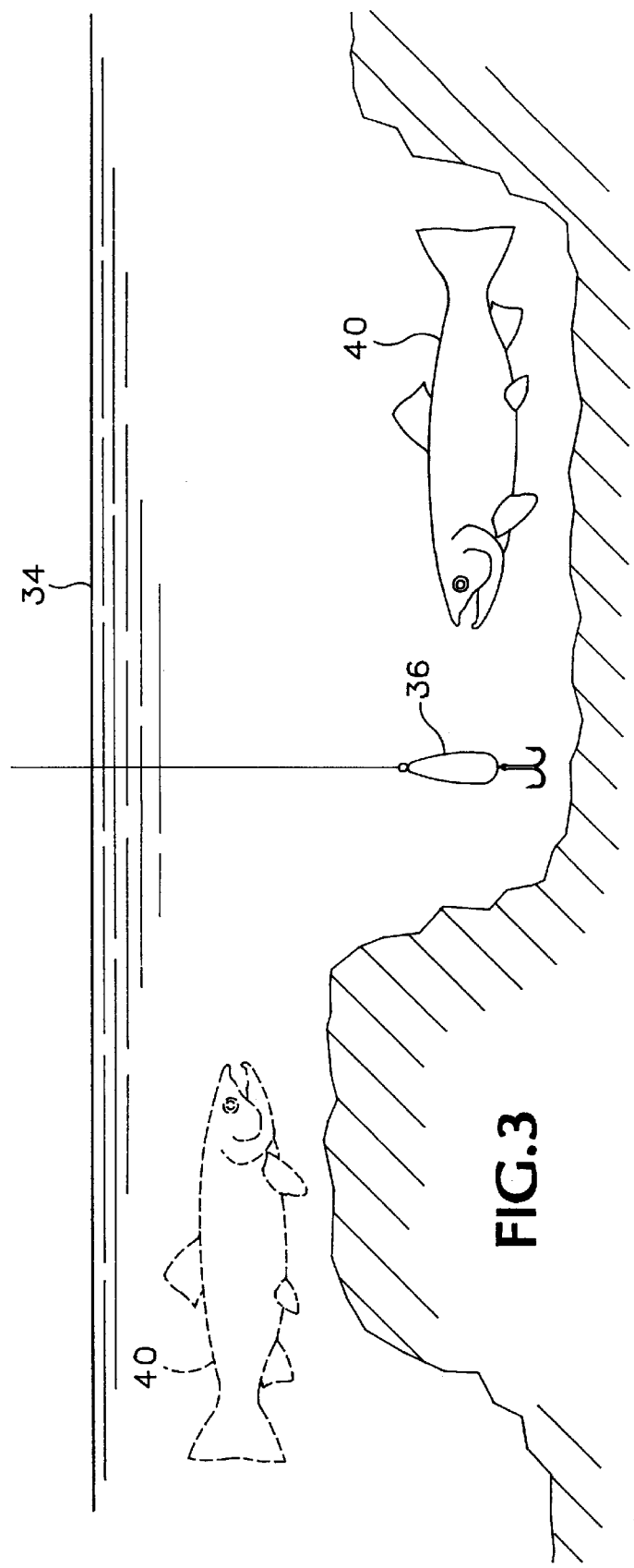

In the type of fishing situation depicted in FIG. 3, where a bottom-bouncing fishing method is being used in water having a relatively irregular underwater topography, there will be relatively little water between the fishing lure and the fish at the time the fish is first presented with the lure. Accordingly, the nominal presentation or "strike" distance will be relatively short. Since the small amount of water that is present in this type of situation will have negligible filtering effect, this condition can be reproduced with the evaluation apparatus 20 shown in FIG. 1 by using a clear type of viewing element 38, which colorless element, indeed, can constitute the air itself. On the other hand, in a different type of fishing situation, such as that shown in FIG. 2 where the lure is being rapidly moved through the water by means of a trolling operation, there can be a large amount of water between the fishing lure 36 and the fish 40 when the lure is first presented to the fish, that is, the presentation or strike distance will be relatively long. Referring again to FIG. 1, here the water will have a large filtering effect so that preferably a colored type of filter is used for the viewing element 38 to reproduce this effect. The filter color is preferably selected in accordance with the general principles described hereinabove.

As an example of viewing element selection, the fisherman may decide that he wishes to fish for winter steelhead in water primarily of green coloration. Referring to the corresponding table 42 of FIG. 4, in order to reproduce the filtering effect of this water for a "long strike" condition, preferably a red-free green filter is selected for the viewing element 38 just as a similar type of filter is preferably selected for the transmission element 22 in order to represent the filtering effect of the water between the natural light source and the underwater lure. Of course, it is also possible to reproduce intermediate conditions where, for example, a drift fishing method is being used in water having relatively large underwater pockets so that the nominal presentation distance will be of an intermediate size. As indicated in table 42 for the conditions hereinabove given, the filtering effect of this intermediate distance of water can be reproduced by a red-muted green filter which will absorb most, but not all, of the red component of the filtered light.

The practical significance of using a viewing element 38 in conjunction with the evaluation apparatus 20 can be illustrated by considering the case of a fishing lure of fluorescent red color. Provided, for example, that there is a higher wavelength component (e.g., a blue component) in the underwater light that illuminates this type of lure, this lure will emit its longer wavelength or red component. Accordingly, if the water, for example, is of green coloration, the "deep water" color shift that can occur between the water surface and the lure will not affect this fluorescent lure since the blue component needed to trigger the red emission of the lure will not be substantially absorbed by water of this color at least at normal feeding depths for the indicated types of fish. However, the "long-distance" color shift that can occur between the lure and the fish will have an effect in this situation, that is, as increasingly more water is introduced between the underwater lure and the fish, the red emission of this fluorescent lure will be increasingly absorbed. Hence, a fish close to the lure will be presented with the red color of the lure whereas a fish relatively far away will be presented with only a black color in the direction of the lure. Because of these effects, it is desirable to utilize a viewing element 38 with the fishing-lure evaluation apparatus 20 in order to correct for different nominal presentation distances and to render a truer reproduction of the underwater color of the lure as seen by the fish.

In accordance with the foregoing description, the use of tables 42, 44 and 46 that are shown in FIGS. 4, 5 and 6, respectively, will be evident. Referring, for example, to table 44 of FIG. 5, in preparation for fishing for river salmon in water of green coloration (which the table indicates is primarily the color encountered in winter), a red-free green filter that exhibits 35–40% transmissivity over all light components except red is preferably selected as the light transmission element 22. Assuming that a drift fishing approach is used and that relatively large underwater pockets are known to be present in the river, this suggests a nominal presentation or strike distance of intermediate size so that, in accordance with the table, a red-free green filter is also preferably selected for the viewing element 38. It will be noted that for green and brown winter river conditions, the boxes under the "long strike" designation are labeled "NA" to signify "not applicable." This reflects the fact that salmon will not cover long distances of about 10 feet or more in order to strike a target when their metabolism has slowed down in accordance with the cold water typically encountered in the winter. With respect to the boxes labeled "NA" that pertained to "short strike" and "intermediate strike" situations in "ocean" water, these designations reflect the fact that the ocean has relatively few obstructions that would conceal a target lure from the fish so that, as a practical matter, only the "long strike" condition is applicable.

Referring to the table in FIG. 6, it will be seen that with respect to trout, each of the boxes associated with a green or brown water condition have been given the NA designation. This reflects the fact that trout will not feed in relatively dirty water of green or brown color.

As will be evident from the foregoing description, an important advantage of the evaluation system of the present invention is its versatility. Referring to FIGS. 1 and 4 together, it will be noted that with just one or two filters for the light transmission element 22 (red-free green and a blue-free block) and with just one additional filter for the viewing element 38 (red-free green), it is possible to evaluate fishing lures for the majority of winter fishing situations involving steelhead. These same filters can also be used in an emergency for the majority of winter fishing situations involving river-feeding salmon (of course, filters with somewhat lower transmissivity would be preferable if available). Moreover, the system of the present invention can be practiced in connection with all types of lures, including store-bought lures, homemade lures, fluorescent lures, non-fluorescent lures, single-color lures and multicolored lures. Furthermore, the system of the present invention can be used with whatever lures the fisherman happens to have on hand and is flexibly adaptable to the actual color preferences of the local fish population. The fisherman, in particular, is not constrained to a choice of a very small number of "optimal" colors.

Yet another advantage of the system of the present invention is that the assortment of color filters preferably provided for the light transmission element 22 or viewing element 38 are inexpensive, relatively durable, lightweight and easily portable. In addition to the clear and red-free green filters, other filters that can be used to duplicate different fishing situations, such as those found in summer steelhead and ocean/tidewater conditions, include red-muted green, blue-free, and white-frosted.

Referring to FIGS. 7 and 9, a first alternative embodiment 52 of a fishing-lure evaluation apparatus is therein shown. This apparatus comprises a hollow tube 54 that is preferably of a lightweight, durable, transparent material, such as plexiglass or plastic. This tube forms the light transmission element for this particular apparatus, that is, the light passing through this tube substantially constitutes the light that illuminates the fishing lure 36 under examination. In order to achieve this effect, the material forming the tube can either be dyed with a pigment corresponding to the preferred filter color or one or more colored sheets of MYLAR™ film (not depicted) can be inserted through the open end 56 of the tube so as to serve as an inner lining along the tube sides 58. If desired, this apparatus can be sold with a number of these MYLAR™ sheets already preinserted so as to enable selection of the filter type by removal of all but one or two of the sheets. In the preferred version of the apparatus shown in FIG. 9, the sides are of plexiglass material that is colored by a red-free green dye. This dye color was selected for its general applicability to a wide variety of winter fishing conditions.

At the end of the tube 54 opposite the open end 56, a viewing element 60 is preferably provided in accordance with the principles of filter selection discussed hereinabove. In the preferred apparatus shown in FIG. 9, the length of the tube is approximately 6–10 inches. Correspondingly, the viewing element is preferably configured to act as a +3 to +6 diopter condensing lens so that the fisherman can observe the fishing lure 36 at the tube's opposite end without difficulty notwithstanding the tube's length. It is important that the tube not be made too short in order to ensure that the light illuminating the fishing lure is substantially limited to that which passes through the sides of the tube in order to avoid washing-out or other distortion of the color filtering effect. In the preferred version shown, the viewing element is snap-fitted to the end of the tube to enable convenient interchangeability of viewing elements.

With respect to the preferred version of apparatus 52 depicted in FIG. 9, the viewing element 60 comprises a lens of clear type. In combination with the red-free green color of the tube sides 58, this selection enables the depicted apparatus to be advantageously used for those fishing conditions that typically exist for winter steelhead. In particular, with reference also to table 42 of FIG. 4, when the fishing method used is likely to result in a short nominal presentation or strike distance, such as when a bottom-bouncing method is used, the fisherman preferably observes the fishing lure through the clear viewing element 60. On the other hand, when the method of fishing used is likely to result in a long presentation or strike distance, the fisherman then shifts his point of reference so that he is looking through the red-free green sides of the tube. These sides, in other words, can either function as a light transmission element only or as both a light transmission element and a viewing element simultaneously.

In comparison with the exemplary evaluation apparatus 20 shown in FIG. 1, the first alternative apparatus 52 has the advantage that it can be used outdoors under natural lighting conditions without recourse to a darkened room or nightfall. If an opaque viewing surface 62 is used as a support for the fishing lure 36 and if this support is flat so that the sides 58 of the tube effectively surround the fishing lure when the open end 56 of the tube is placed over the lure, this will ensure that the light illuminating the lure is substantially limited to light which has been transmitted through the sides of the tube. Depending on which direction the viewing element 60 faces in relation to the outdoor light, the only other procedure that might be needed for this apparatus to operate effectively is for the viewing element 60 to be covered with the hand when using the sides of the tube to view the lure. Where there are a number of lures to be evaluated, this can be achieved with apparatus 52 by viewing each lure in succession although, in this instance, it would be easier to use evaluation apparatus 20 since, as noted above, apparatus 20 is particularly well-suited to the simultaneous evaluation of a number of lures.

In order to provide a sense of the variations possible, FIGS. 8 and 10 are included herewith to show a second alternative embodiment 64 of a fishing-lure evaluation apparatus. In this apparatus, a sighting tube 66 having opaque sides 67 is provided. Coupled diagonally to this tube in fluid communication therewith is an opaque stem portion 68. This stem portion mounts an artificial light source 70 and one or more light transmission elements 72 and 74. These light transmission elements are removably inserted into the stem portion through a side opening (not shown). A viewing element 76 is snap-fitted to the end of the sighting tube opposite its hollow end 78.

With respect to its method of use, the apparatus 64 is generally similar to the apparatus 52 insofar as the fishing lure 36 to be evaluated is placed on an opaque viewing surface 62, and the open end 78 of the tube is next placed over the lure, whereupon the lure can be observed through the viewing element 76 (with this apparatus, there is no option of viewing the lure through the sides of the tube). A distinguishing feature of apparatus 64 is that the amount of light leaving the light-emitting end 80 of the artificial light source 70 can be controlled by means of a light adjustment knob 82. Adjustment of this knob essentially provides the same effect that is possible by switching between light transmission elements of different transmissivity, that is, using this type of lighting control, the light level preferences of different types of fish (shallow feeders, mid-level feeders and bottom feeders) can be more flexibly accommodated. In this regard, it may be noted that a somewhat similar effect can likewise be achieved with respect to the first alternative apparatus 52 by slightly tipping up the open end 56 of the tube 54 to allow a small amount of unfiltered light to enter below the tube (this procedure normally would not be performed beyond that point where noticeable distortion in the reproduced underwater lure color begins to occur).

As will be evident from the foregoing description, at least the broader aspects of the present invention can be advantageously utilized without restriction to a particular type of filter combination, a particular type of fish, or a particular type of apparatus. As stated in the objects of the present invention, the system of the present invention has universal applicability to all types of fishing lures. At the same time, this system can be used to accommodate the particular color preferences of local fish populations. The system of the present invention does presume, however, that the target fish visually seeks out its food rather than substantially relying on its sense of smell as is the case with such fish as sturgeon and catfish.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for evaluating a fishing lure for underwater effectiveness in relation to a body of water believed to contain fish comprising:

(a) providing a color filter correlated to a color-related aspect of said water; and (b) evaluating said fishing lure for underwater effectiveness while said fishing lure is removed from water including by viewing said fishing lure while illuminating said fishing lure primarily with light transmitted through said color filter.

2. The method of claim 1 including viewing said fishing lure through a viewing element of different color than said color filter.

3. The method of claim 1 including illuminating said fishing lure in a room darkened except for said light.

4. A method for evaluating a fishing lure for underwater effectiveness in relation to a body of water believed to contain fish comprising:

(a) providing a color filter correlated to a color-related aspect of said water;

(b) obtaining a natural food specimen of a selected type of fish; and (c) evaluating said fishing lure in relation to other fishing lures and in relation to said specimen including by illuminating each fishing lure and also said specimen while each is removed from water with light transmitted through said color filter and thus observing each in order to determine which one of said fishing lures most closely matches a color aspect of said specimen.

5. The method of claim 4 including repeating said method with said natural food specimen replaced by a different standard proven to be locally attractive to said selected type of fish.

6. The method of claim 5 including using for said standard yet another lure previously proven to be locally effective.

7. The method of claim 4 including illuminating said fishing lures and said specimen simultaneously.

8. The method of claim 4 including matching a combination of colors presented by said specimen.

9. A method for evaluating a fishing lure for underwater effectiveness in relation to a body of water believed to contain fish comprising:
  (a) selecting a first light transmission element of predetermined color based on a color-related aspect of said water; and
  (b) evaluating said fishing lure for underwater effectiveness while said fishing lure is removed from water including by viewing said fishing lure as illuminated with light transmitted through said first light transmission element.

10. The method of claim 9 further including repeating step (b) with a second light transmission element not of said predetermined color in preparation for fishing a different body of water having a different color-related aspect.

11. The method of claim 9 including selecting said first light transmission element based on a particular type of fish having a nominal light level preference.

12. A method for evaluating a fishing lure for underwater effectiveness in relation to a body of water believed to contain fish comprising:
  (a) selecting a first viewing element of predetermined color based on a nominal presentation distance in said water between said fishing lure and said fish; and
  (b) evaluating said fishing lure for underwater effectiveness while said fishing lure is removed from water including by viewing said fishing lure through said first viewing element.

13. The method of claim 12 further including repeating step (b) with a second viewing element not of the same color as said first viewing element based on a different nominal presentation distance.

14. The method of claim 12 including varying said nominal presentation distance by changing how said fishing lure is being moved through said water.

* * * * *

UNITED STATES PATENT AND TRADEMARK OFFICE
CERTIFICATE OF CORRECTION

PATENT NO. : 6,161,323
DATED : December 19, 2000
INVENTOR(S) : Colin J. Kageyama It is certified that error appears in the above-identified patent and that said Letters Patent is hereby corrected as shown below:

Column 12,
Lines 29-30, change "include red-muted green, blue-free, and white-frosted." to
-- include red-muted green, blue-free, UV and white-frosted. --

Signed and Sealed this

Seventeenth Day of September, 2002

Attest:

Attesting Officer

JAMES E. ROGAN
Director of the United States Patent and Trademark Office